Nov. 17, 1959 A. EDELSTEIN 2,913,569
LIGHTING APPARATUS FOR PHOTOGRAPHY
Filed Sept. 7, 1955 3 Sheets-Sheet 1
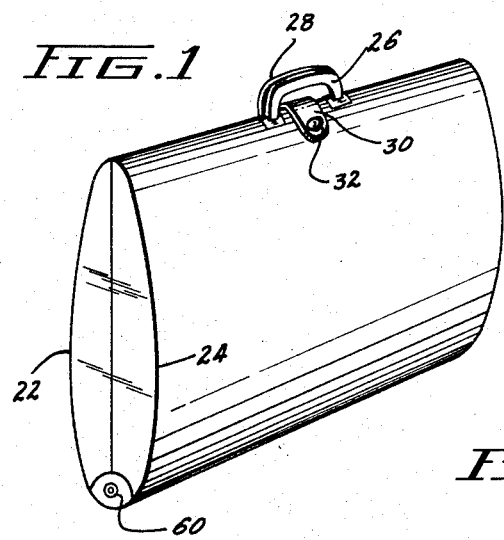
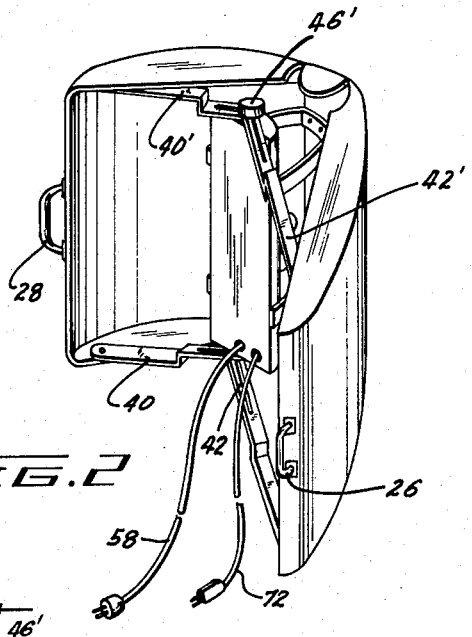
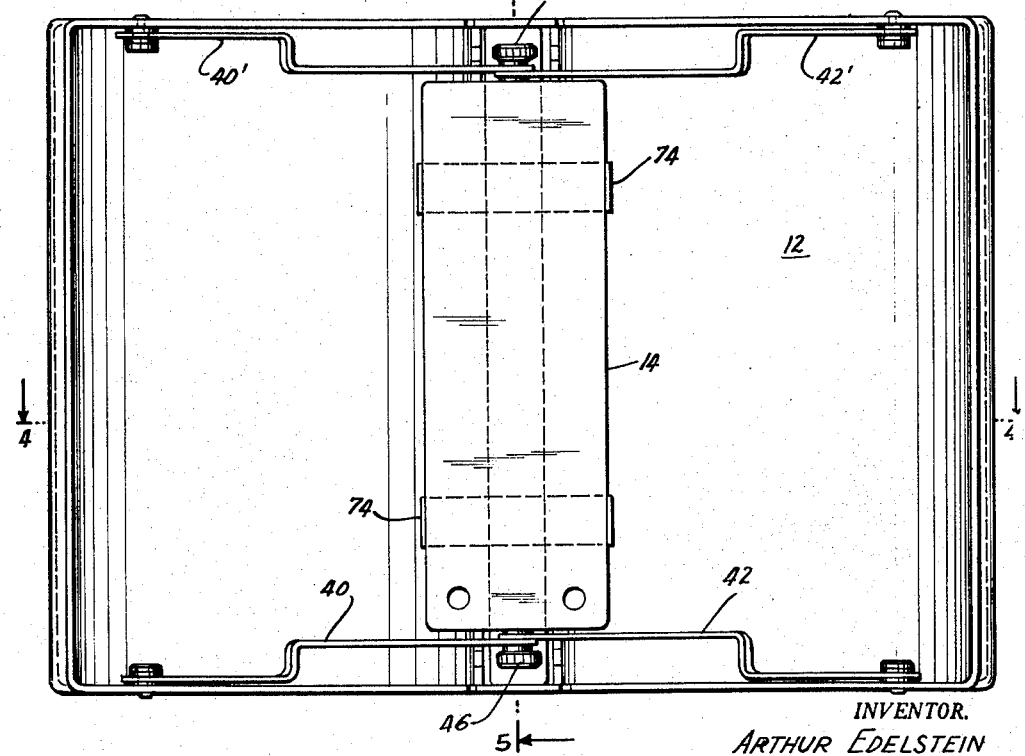
INVENTOR.
ARTHUR EDELSTEIN
BY
ATTORNEY

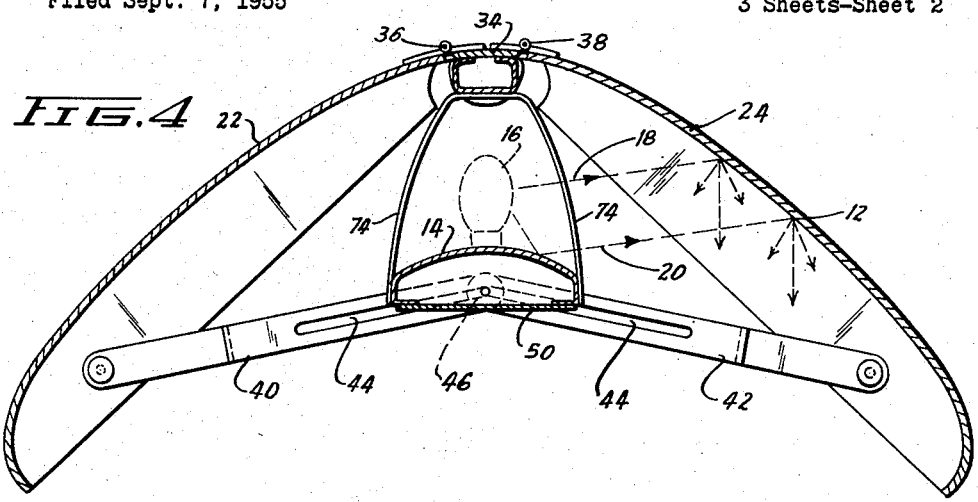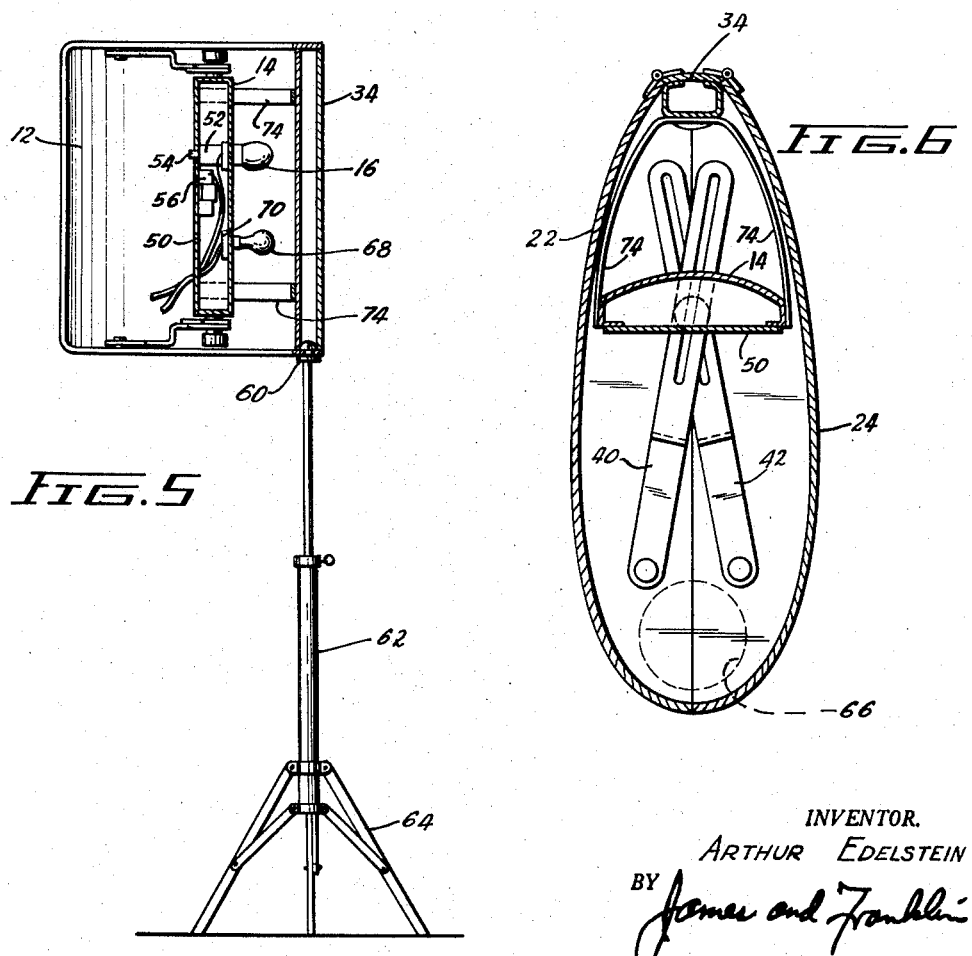

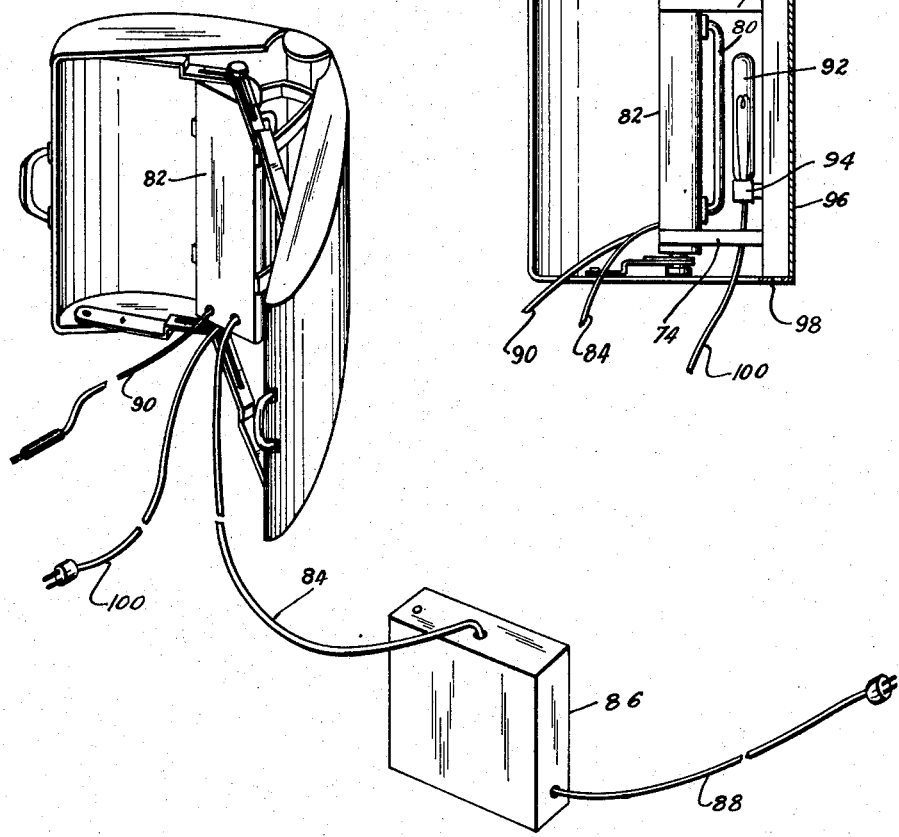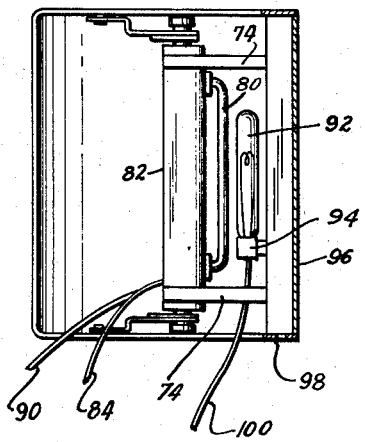

United States Patent Office 2,913,569
Patented Nov. 17, 1959

2,913,569

LIGHTING APPARATUS FOR PHOTOGRAPHY

Arthur Edelstein, Forest Hills, N.Y.

Application September 7, 1955, Serial No. 532,896

4 Claims. (Cl. 240—1.3)

This invention relates to lighting apparatus and more particularly to portable lighting apparatus for use in photography.

The usual procedure when taking photographs, particularly portraits, under artificial light, is to use two or more sources of light in such a way as to give the subject a pleasing appearance. A typical arrangement is to provide a main source of light located somewhat to the side of the subject, and a secondary source of light located somewhat to the opposite side of the subject, in order to reduce the contrast or difference in light intensity between the lighter and darker sides. One or more additional lights are used at a relatively high elevation to give highlights to the hair, or to light a part of the background for special effects.

Such an arrangement of multiple sources of light is troublesome to handle even in a studio, and even more so when the photographer visits the subject away from a studio. It is too complex for use by an ordinary amateur.

The primary object of the present invention is to generally improve lighting apparatus for use in photography. A more particular object of the invention is to provide lighting which is generally of the desired character described above, but which is obtained from a single source of light. Viewed somewhat differently, an object of the present invention is to provide lighting apparatus which provides satisfactory and pleasing lighting of the subject, and yet which is so simple and foolproof in operation that even an inexperienced amateur will obtain excellent photographic results.

Still further objects are to provide such lighting apparatus which may be folded to compact dimension; which acts as its own casing; and which therefore is easily portable.

Still another object is to provide such lighting apparatus in slightly modified forms for use with battery operated flash bulbs, with electronic flash equipment, and with a photo flood lamp for continuous lighting.

Another object is to provide a lighting apparatus of the specified character which may be supported on an ordinary folding tripod, and indeed, which may include such a tripod as a part of the apparatus housed within the casing thereof when closed. A further object is to provide the apparatus with a built-in modelling light for the convenience of the photographer when preparing to take a picture.

To accomplish the foregoing objects, and other more specific objects which will hereinafter appear, my invention resides in the lighting apparatus, and the elements thereof, and their relation one to another, as are hereinafter more particularly described in the following specification. The specification is accompanied by drawings, in which:

Fig. 1 is a perspective view showing the apparatus in folded or closed condition;

Fig. 2 is a perspective view showing one form of the apparatus in open condition;

Fig. 3 is a front elevation of the same;

Fig. 4 is a horizontal section taken approximately in the plane of the line 4—4 of Fig. 3;

Fig. 5 is a vertical section taken approximately in the plane of the line 5—5 of Fig. 3;

Fig. 6 is a horizontal section similar to Fig. 4 but with the reflector in closed condition;

Fig. 7 is a perspective view of a modified form of the apparatus; and

Fig. 8 is a view similar to Fig. 5 but showing the modified apparatus.

Referring to the drawing, and more particularly to Figs. 3, 4 and 5, the apparatus comprises a relatively large main reflector 12, which is concave and conforms to a part of the surface of an upright cylinder. In its preferred form the shape or cylinder is parabolic. The inside or concave surface is made to have a light diffusing character. Preferably it is coated with a suitable non-gloss paint or the like, to give the same a white matte surface. The resulting parabolic reflector is almost wholly open at the top, for reasons explained later, and it preferably is similarly open at the bottom.

The apparatus further comprises an oppositely faced relatively small front reflector 14. This front reflector is also cylindrical on an upright axis, that is, the elements of both reflectors are parallel. The front reflector 14 is convex, and preferably is highly polished. It too is open at the top and bottom.

A lamp 16 is disposed between the main reflector 12 and the front reflector 14. It preferably is located with its filament or source of illumination approximately at the focus or focal line of the parabolic reflector.

With this arrangement the subject is fully shielded against illumination directly from lamp 16, for the front reflector 14 acts as an opaque barrier between the lamp and the subject. However, the subject does receive diffused illumination from the main reflector 12. This will be clear from the arrows in Fig. 4, which show how part of the light, represented by the arrow 18, moves directly from the lamp 16 to the reflector 12, and is reflected, with some diffusion, to the subject. Another part of the light from the lamp 16 first strikes the front reflector 14, from which it is reflected to the main reflector 12, as is indicated by the arrow 20, and then is again reflected, with some diffusion, toward the subject.

There is no obstruction to upward flow of light from lamp 16, and it is primarily for this purpose that both reflectors are left open at the top in the region above the lamp 16. Thus a substantial amount of light strikes the ceiling, which ordinarily is white or at least light in color. Light is reflected downward from the ceiling toward the subject, thereby providing overhead light, which is beneficial in order to highlight the hair of the subject, and to help avoid the excessive shadows which ordinarily are formed when working with a single light source of more conventional type.

As so far described the main reflector might be rigid in construction, but in preferred form it is hinged and folds to relatively flat compact dimension somewhat resembling a briefcase. Referring to Fig. 1, the sides 22 and 24 of the main reflector have been folded together about hinge means located at the bottom. The outside of the reflector acts as its own protective case. It is preferably provided with a handle 26 to facilitate carrying the same as a portable unit, and in the present case is provided with two handles 26 and 28, one on each side, as shown in Fig. 2. These come close together and are used as a single handle, as shown in Fig. 1. The halves of the reflector may be locked together in any desired fashion, as by use of a flap 30 with a clasp 32.

Reverting to Fig. 4, the main reflector is provided with a back column 34, and the side 22 of the reflector is hinged at 36 to one edge of the back column 34, while the other side 24 of the reflector is hinged at 38 to the other edge of the column 34. The sides then fold together, as shown by the change from Fig. 4 to Fig. 6.

Referring to Figs. 2, 3 and 4, the foldable sides 22 and 24 of the main reflector may be connected to the front reflector 14 by means of struts 40 and 42. These limit the opening of the main reflector to its desired preferably parabolic shape, but they are provided with releasable locking means which afford closing of the same. Specifically, in the present case the struts are slotted at 44 and are received by a thumb screw 46 at the lower end of the front reflector 14. The thumb screw may be tightened when the reflector is opened, or loosened when the reflector is to be closed. The manner in which the struts come together will be clear from inspection of Fig. 6. The struts are preferably stepped upward, except at their outer ends, as indicated in Fig. 3, thus affording ample clearance for the thumb screw 46, which then is housed within the casing when the main reflector is closed.

While not essential, the apparatus may be provided with a pair of top struts similar to those described at the bottom, and such struts, together with a thumb screw for the same, are shown in Fig. 3 at 40', 42' and 46'.

The front reflector 14 is preferably made part of a generally upright column. This is formed by combining the reflector with a rear wall 50 (Figs. 4 and 6), and the thumb screws 46 and 46' previously referred to are preferably located at the closed top and bottom ends of the column. The upright column is, of course, shorter than the height of the reflector, and the entire column is housed within the reflector when the latter is closed, as shown in Figs. 3 and 6.

The front column is secured to and spaced from the back column by appropriate support arms. In the present case there are four such arms 74. The two upper arms may be formed integrally with one another by shaping a generally U-shaped member, the center portion of which is secured to the rear column. The two lower arms are similarly formed as parts of an identical U-shaped member.

The resulting front column may be used as a casing to receive a socket and flashlight battery cells for energizing the flash lamp 16. More specifically, the column carries a socket 52 adapted to detachably receive conventional flash bulbs, and this socket is preferably provided with an ejector button 54, which may be of conventional character and which passes through the front wall 50, as shown in Fig. 5. One of the battery cells is indicated at 56, it being understood that in this case there are a pair of such cells, disposed side by side. A different number of cells may be used.

Referring now to Fig. 2, a flexible insulated wire 72 of adequate length is provided with a suitable terminal for connection to the synchronized shutter switch of the camera. This is preferably a two wire cable, for the apparatus here illustrated will ordinarily not be attached directly to the camera, and thus a ground connection is needed. Indeed, for best results the camera is preferably located a little to one side of the reflector, thus providing lighting which is effectively somewhat stronger on one side than the other, and which accordingly is equivalent to the use of main and auxiliary lighting sources on opposite sides of the subject.

For convenience the complete lighting unit may be mounted on a suitable support, preferably a conventional tripod. This is shown in Fig. 5 in which the reflector is provided with a standard screw threaded socket 60, which is received at the upper end of a telescopic tripod 62, having folding legs 64. The tripod may be conventional in character, but when folded preferably has a length somewhat shorter than the height of the main reflector, in which case the collapsed tripod may itself be received within the case formed by the reflector, as suggested schematically by the broken line 66 in Fig. 6 of the drawing. The tripod is preferably slid into a fabric or equivalent soft sheath before being placed in the closed reflector, in order not to mar the white matte reflective surface of the same. Alternatively, the collapsed tripod may be detachably secured in suitable spring clips, not shown, along the outside of the back column 34 of the reflector.

It is convenient to provide a modelling light, which preferably is an ordinary 110 volt lamp bulb which may be left on continuously while the photographer arranges his apparatus and subject. Such a modelling lamp is shown at 68 in Fig. 5, it being received in an ordinary lamp socket 70 having a screw base for a standard bulb. The socket may be mounted on the front column beneath the socket 52, or it may be mounted on the back column 34. In either case a flexible extension cord extends from socket 70, this cord being shown at 58 in Fig. 2. It terminates in a male plug for insertion in an ordinary wall outlet.

As so far described, battery operated flash bulbs have been shown, requiring bulb replacement after each photograph. However, the apparatus is well adapted for use with the newer repeating flash or so-called "electronic flash bulb," and a modification for that purpose is shown in Figs. 7 and 8 of the drawing. The electronic flash bulb 80 is in the form of a slender tube disposed vertically on the axis of the parabola, but the bulb may take any other desired form. The circuitry for triggering or flashing the bulb may be housed in the front column 82. A flexible cable 84 extends to a suitable power pack 86 (Fig. 7) for energizing the electronic flash bulb, and if this power pack is of the type which may be connected to a 110 volt line, a flexible cable 88 is provided for that purpose. Another flexible wire 90 leads from column 82 to the synchronized shutter operated switch of the camera.

Electronic flash equipment is made which is battery operated instead of being energized from an ordinary 110 v. A.C. outlet. When battery energized electronic flash equipment is used the batteries may be contained within the front column 82, thus dispensing with the cable 84, power pack 86, and cable 88.

Reverting to Fig. 8, a modelling lamp 92 may be provided, and in this case the lamp is of the slender elongated type used to illuminate paintings. It is received in a socket 94 secured to the back column 96 of the main reflector 98. A flexible cable 100 may extend from socket 94 for connection to an ordinary 110 volt wall outlet. Reverting to Fig. 7, it is evident that the cable 100 could be combined with the cable 88, but separate cables are shown because various power pack arrangements of otherwise standard character may be used with the lighting apparatus here shown. With separate cables, the power pack may be of any conventional character.

Although I have described my invention in terms of still photography, using flash illumination, it will be understood that by using a photo flood type of lamp for continuous illumination, the lighting apparatus may be used for motion picture photography.

In one example of my invention the reflector, when folded as shown in Fig. 1, provided a case approximately twelve inches high, fourteen inches long, and four inches deep at the thickest part. The reflector when opened had a dimension of approximately fourteen inches high and nineteen inches wide when viewed as in Fig. 3 of the drawing. It will be understood that these dimensions are given solely by way of illustration of one specific structure, and are not intended to be in limitation of the invention. The socket 52 for flash bulb 16 was located halfway between the top and bottom of the reflector. It is preferably located at or near the mid-point, and the modelling lamp 68, being less important, is preferably displaced from the mid-point.

It is believed that the construction and method of use, as well as the advantages of my improved lighting apparatus, will be apparent from the foregoing detailed description. The apparatus provides a diffused light of subdued intensity. It provides a generalized lighting which avoids harsh shadows. The subject is shielded from direct illumination or glare from the flash bulb. Considerable overhead lighting is provided, and this is particularly effective when the apparatus is used indoors as here contemplated, because of reflection from the ceiling. There is also some reflection from the floor, which again is of help in avoiding excessive shadows. The overall effect is as though multiple sources of light have been used, although the illumination is from a single source. The apparatus is portable, and when folded, is compact and acts as its own casing.

The amount of light that will be reflected from the usual white ceiling, compared to the intensity of the light reflected by the main reflector, is of generally correct ratio for good photographic balance, and this is true for both black and white and color films. The apparatus therefore will provide satisfactory and pleasing lighting even when used by an inexperienced amateur. However, if desired the ratio of lighting may be varied to some degree by varying the distance between the reflector and the subject, because as the reflector is brought near the subject the intensity of the light from the reflector increases rapidly, whereas that reflected overhead increases only slightly.

The light reflected from the ceiling helps light the hair of the subject, and also provides "fill-in" light for the side of the subject which is away from the reflector. This helps avoid the excessive shadows which ordinarily are formed when working with a single light source of more conventional type. Differently expressed, it helps provide a more satisfactory balance of light intensities between the darker and brighter sides of the subject.

A conventional single light source provides an undesirable, sharp, well defined shadow on the background, mainly because it performs like a single point light source. With my invention this distracting effect is minimized or completely eliminated because of the relatively large reflecting surfaces. This is true even disregarding the light reflected from the ceiling which further helps to reduce the intensity of background shadow.

It will be apparent that while I have shown and described my invention in several preferred forms, changes may be made in the structures shown, without departing from the scope of the invention, as sought to be defined in the following claims. In the claims the term "cylindrical" is used in its broad sense, and does not mean a cylinder which is circular in section.

I claim:

1. Lighting apparatus for photography, said apparatus comprising a relatively large main reflector which is cylindrical and concave, the elements of said cylinder being upright, said main reflector having a light diffusing surface, an oppositely faced relatively small front reflector disposed in front of said main reflector, and a socket for holding a lamp between said front and main reflectors, whereby the subject is shielded by the front reflector against direct illumination but receives diffused illumination from the main reflector, the apparatus being so constructed in the region above the lamp as to afford free upward flow of light, whereby in the presence of a ceiling, the ceiling reflection provides overhead light on the subject, said main reflector being hinged near the middle on an upright axis to permit the sides to fold together to form a relatively flat case, said foldable sides being connected to the front reflector by struts provided with releasable locking means, the said struts limiting the opening of the main reflector to desired shape but affording closing of the same, said front reflector and lamp socket being housed within said main reflector when the latter is closed, and a carrying handle to facilitate carrying the lighting apparatus when closed.

2. Lighting apparatus for photography, said apparatus comprising a relatively large main reflector which is cylindrical and concave, the elements of said cylinder being upright, said main reflector having a light diffusing surface, an oppositely faced relatively small front reflector disposed in front of said main reflector, and a socket for holding a lamp between said front and main reflectors, whereby the subject is shielded by the front reflector against direct illumination but receives diffused illumination from the main reflector, the apparatus being so constructed in the region above the lamp as to afford free upward flow of light, whereby in the presence of a ceiling, the ceiling reflection provides overhead light on the subject, said main reflector comprising a back column to one edge of which one half the main reflector is hinged, and to the other edge of which the other half of the main reflector is hinged, whereby the main reflector may be folded to form a relatively flat case, said front reflector forming a part of a front column which is secured to and spaced in front of the said back column, struts extending from the hinged halves of the reflector to the front column to limit the opening of the reflector, said front column and said struts being enclosed within said main reflector when the latter is closed.

3. Lighting apparatus for photography, said apparatus comprising a relatively large main reflector which is cylindrical and concave, the elements of said cylinder being upright, said main reflector having a light diffusing surface, an oppositely faced relatively small front reflector disposed in front of said main reflector, and a socket for holding a lamp between said front and main reflectors, whereby the subject is shielded by the front reflector against direct illumination but receives diffused illumination from the main reflector, the apparatus being so constructed in the region above the lamp as to afford free upward flow of light, whereby in the presence of a ceiling, the ceiling reflection provides overhead light on the subject, and the large area and diffusing surface of the main indirect reflector serving to avoid the harsh shadows which are produced by a concentrated direct source of light, said socket being designed to receive a repeating or so-called electronic flash bulb, said front reflector forming a part of an upright hollow casing within which the triggering circuitry for the flash bulb is housed, and a flexible extension leading to the shutter synchronized switch of the camera.

4. Lighting apparatus for photography, said apparatus comprising a relatively large main reflector which is cylindrical and concave, the elements of said cylinder being upright, said main reflector having a light diffusing surface, an oppositely faced relatively small front reflector disposed in front of said main reflector, and a socket for holding a lamp between said front and main reflectors, whereby the subject is shielded by the front reflector against direct illumination but receives diffused illumination from the main reflector, the apparatus being so constructed in the region above the lamp as to afford free upward flow of light, whereby in the presence of a ceiling, the ceiling reflection provides overhead light on the subject, and the large area and diffusing surface of the main indirect reflector serving to avoid the harsh shadows which are produced by a concentrated direct source of light, said socket being designed to receive a repeating or so-called electronic flash bulb, said front reflector forming a part of an upright hollow casing within which the triggering circuitry for the flash bulb is housed, a flexible extension cord leading to a power pack for the electronic flash bulb, and another flexible extension leading to the shutter synchronized switch of the camera.

(References on following page)

References Cited in the file of this patent

UNITED STATES PATENTS

| | | |
|---|---|---|
| 1,748,057 | Arbuckle | Feb. 25, 1930 |
| 2,013,721 | Waterbury | Sept. 10, 1935 |
| 2,205,860 | Olds | June 25, 1940 |
| 2,277,698 | Germeshausen | Mar. 31, 1942 |
| 2,615,120 | Macksoud | Oct. 21, 1952 |
| 2,624,831 | Farber | Jan. 6, 1953 |
| 2,745,945 | Blount | May 15, 1956 |
| 2,777,939 | Spath | Jan. 15, 1957 |

FOREIGN PATENTS

| | | |
|---|---|---|
| 365,806 | Great Britain | Jan. 28, 1932 |
| 615,040 | Great Britain | Dec. 31, 1948 |